(12) United States Patent
Ito

(10) Patent No.: US 6,594,379 B1
(45) Date of Patent: *Jul. 15, 2003

(54) METHOD AND APPARATUS FOR PROCESSING RADIATION IMAGE

(75) Inventor: Wataru Ito, Kanagawa-ken (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/912,338

(22) Filed: Aug. 18, 1997

(30) Foreign Application Priority Data

Aug. 16, 1996 (JP) ............................................. 8-216236

(51) Int. Cl.[7] ................................................. G06K 9/00
(52) U.S. Cl. ...................................... 382/132; 382/282
(58) Field of Search ................................. 382/132, 128, 382/282, 283, 274, 268; 378/7, 87, 150, 151, 152, 206; 128/922; 600/425

(56) References Cited

U.S. PATENT DOCUMENTS

| 4,851,678 A | 7/1989 | Adachi et al. ............ 250/327.2 |
| 4,967,079 A | 10/1990 | Shimura ................... 250/327.2 |
| 4,977,504 A | * 12/1990 | Funahashi ............... 364/413.13 |
| 5,015,853 A | * 5/1991 | Nakajima ................. 250/327.2 |
| 5,068,907 A | 11/1991 | Takeo ........................... 382/48 |
| 5,081,580 A | 1/1992 | Takeo .................... 364/413.13 |
| 5,151,947 A | * 9/1992 | Nagatsuka et al. ......... 382/132 |
| 5,644,649 A | * 7/1997 | Schoeters et al. ........... 382/132 |
| 5,732,149 A | * 3/1998 | Kido et al. ................. 382/128 |
| 5,764,791 A | * 6/1998 | Hara .......................... 382/132 |
| 5,883,972 A | * 3/1999 | Ito .............................. 382/132 |

FOREIGN PATENT DOCUMENTS

JP 3-98174 4/1991 ........... G06F/15/68

OTHER PUBLICATIONS

Rafeal C. Gonzalez and Richard E. Woods, "Digital Image Processing," pp. 166–167, 1992.*

* cited by examiner

Primary Examiner—Yon J. Couso
(74) Attorney, Agent, or Firm—Sughrue Mion, PLLC

(57) ABSTRACT

A radiation image which has been recorded using an irradiation field stop and has an irradiation field is read out and an image representing the radiation image is obtained. The irradiation field is recognized and a gradation inversion processing is carried out on the image signal components corresponding to the picture elements recognized to be outside the irradiation field, out of the image signal components which make up an image signal for reproducing the radiation image as a visible image.

4 Claims, 1 Drawing Sheet

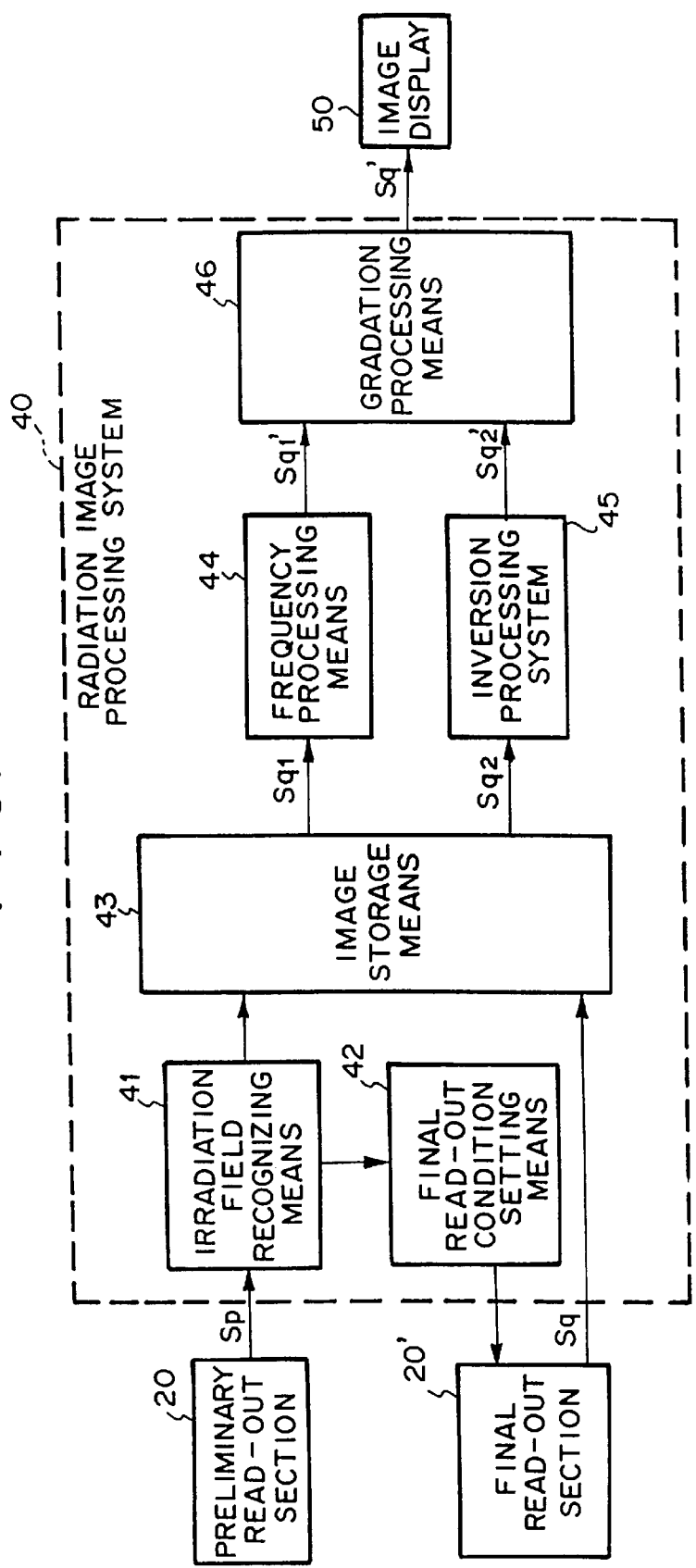

METHOD AND APPARATUS FOR PROCESSING RADIATION IMAGE

BACKGROUND OF THE INVENTION

1. Field of the Invention

This invention relates to a method of and apparatus for carrying out image processing on an image signal obtained from a recording sheet on which a radiation image is recorded and particularly on an image signal representing a radiation image recorded using an irradiation field stop for limiting the irradiation field of radiations.

2. Description of the Related Art

Carrying out a suitable image processing on an image signal obtained by reading a recorded radiation image and reproducing a visible image on the basis of the processed image signal have been practiced in various fields, for instance, in a radiation image recording and reproducing system using stimulable phosphor sheets disclosed in our many patent applications.

When recording a radiation image on a recording sheet, it is often desired that portions of the object not related to diagnosis or the like be prevented from being exposed to radiation, thereby preventing adverse influence of radiation on the object. Further when the object portions not related to diagnosis or the like are exposed to radiation, the radiation is scattered by such portions and the quality of the radiation image is lowered by the scattered radiation. Therefore, an irradiation filed stop is often used in order to limit the irradiation field so that the radiation are irradiated only on the necessary part of the object.

In such a case, the read-out conditions and image processing conditions are determined on the basis of the image signal components corresponding to the picture elements in the irradiation field. The irradiation field can be recognized, for instance, in the following manner as disclosed in U.S. Pat. No. 4,967,079. That is, image signal components for picture elements on each of a plurality of radial linear segments joining a predetermined point in the irradiation field and a plurality of points on the edges of the recording sheet are read out, and a prospective edge point, which is considered to be on the edge of the irradiation field, is determined for each segment, and the irradiation field is recognized as a region which is circumscribed by a line passing through the prospective edge points.

The radiation image is reproduced, for instance, on a CRT as a visible image or recorded on a photographic film as a visible image by use of a laser printer on the basis of an image signal obtained according to the read-out condition and the image processing conditions thus determined.

However in the case where the radiation image, which is the original of the visible image, is recorded by use of an irradiation field stop, the area of the reproduced image corresponding to the area outside the irradiation field is high in brightness (as reproduced on the CRT) or low in density (as recorded on the film) since the area outside the irradiation field is hardly exposed to radiation. Strong light impinging upon the eyes from the area outside the irradiation field makes the image in the irradiation field difficult to view no matter how high the quality of the image in the irradiation field is. In order to overcome such a problem, conventionally a light-shielding plate or the like is sometimes disposed on the CRT or the film to block light from the area outside the irradiation field.

However since the shape and/or size of the irradiation field differ according to the object, it is troublesome to change the position of the light-shielding plate by the shape and/or size of the irradiation field. Further it is very difficult to clearly separate the area inside the irradiation field from the area outside the irradiation field by the light-shielding plate, and the light-shielding plate sometimes covers up to the edge of the irradiation field and sometimes permits leak of light from the area outside the irradiation field. Thus, the light-shielding plate cannot satisfactorily overcome the aforesaid problem of difficulties in viewing the image in the irradiation field due to light from the area outside the irradiation field.

In the method of and apparatus for processing a radiation image disclosed in Japanese Unexamined Patent Publication No. 3(1991)-98174, the image signal components for picture elements outside the irradiation field are set to a low brightness (when a visible image is reproduced as a brightness distribution on a CRT or the like) or high density (when a visible image is reproduced as a density distribution on film or the like), generally to a minimum brightness or a maximum density, thereby obtaining a visible image free from strong light impinging upon the eyes from the area outside the irradiation field.

However generally the irradiation field cannot be always recognized precisely and an area narrower than the actual irradiation field can be sometimes mistaken for the irradiation field. In such a case, a part of the radiation image which should be observed for, for instance, diagnostic purposes, can exist in the area determined to be outside the irradiation field.

In the method and apparatus disclosed in the above identified Japanese patent publication, the image signal components for picture elements recognized to be outside the irradiation field are evenly set to a low brightness or high density, and accordingly it becomes impossible to know whether the area determined to be outside the irradiation field includes a necessary part of the radiation image.

SUMMARY OF THE INVENTION

In view of the foregoing observations and description, the primary object of the present invention is to provide a method of and apparatus for carrying out image processing on an image signal of a radiation image having been recorded using an irradiation field stop, which permits recognition of whether a part of a radiation image of the object exists in the area determined to be outside the irradiation field while preventing strong light from impinging upon the eyes when viewing the reproduced visible image.

In a method of carrying out image processing on an image signal representing a radiation image which has been recorded using an irradiation field stop and has an irradiation field, the method of the present invention is characterized by the steps of recognizing the irradiation field and carrying out gradation inversion processing on the image signal components corresponding to the picture elements recognized to be outside the irradiation field out of the image signal components which make up an image signal for reproducing the radiation image as a visible image.

In an apparatus for carrying out image processing on an image signal representing a radiation image which has been recorded using an irradiation field stop and has an irradiation field, the apparatus of the present invention is characterized by having a means for recognizing the irradiation field and a gradation inversion means for carrying out gradation inversion processing on the image signal components corresponding to the picture elements recognized to be outside the irradiation field out of the image signal components which make up an image signal for reproducing the radiation image as a visible image.

In the present invention, the irradiation field may be recognized by any suitable algorithm. For example, the method of recognizing the irradiation field based on the assumption that the irradiation field is square (disclosed, for instance, in U.S. Pat. Nos. 4,851,678; 5,068,907 and 5,081,580) and the method disclosed in the aforesaid U.S. Pat. No. 4,967,079 can be employed as well as other various methods.

In accordance with the present invention, since the image signal components corresponding to the picture elements recognized to be outside the irradiation field out of the image signal components which make up an image signal for reproducing the radiation image as a visible image are subjected to gradation inversion processing, the part of the reproduced image corresponding to the area recognized to be outside the irradiation field becomes low in brightness or high in density in the whole. Accordingly the problem that strong light impinges upon the eyes when viewing the reproduced visible image can be avoided. Further even when an area narrower than the actual irradiation field is mistaken for the irradiation field, whether the area determined to be outside the irradiation field includes a necessary part of the radiation image can be known.

Thus the fear that the area which was cut as being outside the irradiation field may include important information, which has been inherent to the conventional image processing, can be overcome.

BRIEF DESCRIPTION OF THE DRAWING

FIG. 1 is a block diagram showing a radiation image reproducing system in which a radiation image processing system in accordance with an embodiment of the present invention is employed.

DESCRIPTION OF THE PREFERRED EMBODIMENT

In the radiation image reproducing system shown in FIG. 1, a radiation image stored on a stimulable phosphor sheet is read out through a preliminary read-out and a final read-out and reproduced as a visible image.

The radiation image reproducing system comprises a preliminary read-out section 20 which carries out preliminary read-out in which only a part of radiation energy stored on the stimulable phosphor sheet is released, a final read-out section 20' which carries out final read-out according to read-out conditions determined by a radiation image processing system 40 (to be described later) on the basis of a preliminary image signal Sp read out by the preliminary read-out section 20, the radiation image processing system 40 which recognizes an irradiation field on the basis of the preliminary image signal Sp and carries out an image processing on a final image signal Sq read out by the final read-out section 20' and an image display means 50 such as a CRT which displays a visible image on the basis of a processed image signal processed by the image processing system 40.

The image processing system 40 comprises an irradiation field recognizing means 41 which recognizes the irradiation field of the radiation image on the basis of the preliminary image signal Sp, a final read-out condition setting means 42 which sets the final read-out conditions on the basis of the image signal components of the preliminary image signal Sp corresponding to the picture elements in the irradiation field recognized by the irradiation field recognizing means 41, an image storage means 43 which stores the final image signal Sq read-out by the final read-out section 20' according to the final read-out conditions in relation to information on the irradiation field obtained by the irradiation field recognizing means 41, a frequency processing means 44 which carries out a frequency processing on the image signal Sq1 for the irradiation field, an inversion processing means 45 which carries out an inversion processing on the image signal Sq2 for the area outside the irradiation field, and a gradation processing means 46 which carries out a gradation processing on the image signal Sq1' obtained by processing by the frequency processing means 41 and the image signal Sq2' obtained by processing by the inversion processing means 45.

The radiation image stored on the stimulable phosphor sheet is read out by the preliminary read-out section 20 and the image signal read out is digitized and input into the image processing system 40 as a preliminary image signal Sp. In the preliminary read-out, the read-out conditions are determined so that light emitted by the stimulable phosphor sheet upon stimulation thereof can be detected over a wide radiation energy range stored on the stimulable phosphor sheet. The read-out conditions include various factors which affect the relation between the amount of light emitted by the stimulable phosphor sheet upon stimulation thereof and the output of the read-out system, e.g., a read-out gain and a scale factor (which determine the relation between the input and output), the power of stimulating rays and the like.

In the image processing system 40, the irradiation field is first recognized on the basis of the preliminary image signal Sp by the irradiation field recognizing means 41, and the final read-out conditions are set on the basis of the information on the irradiation field by the final read-out condition setting means 42. The final read-out conditions determined are input into the final read-out section 20'. The final read-out conditions are set so that light emitted from the stimulable phosphor sheet in the irradiation field upon stimulation thereof is adequately detected without taking into account whether light emitted from the part of the stimulable phosphor sheet outside the irradiation field exposed to only scattered radiation can be adequately detected.

In the final read-out section 20', the final read-out is carried out according to the final read-out conditions, and the image signal read out is digitized and input into the image processing system 40 as a final image signal Sq. The final image signal Sq is stored in the image storage means 43 in relation to the information on the irradiation field obtained by the irradiation field recognizing means 41.

Then the final image signal Sq is separated into the image signal Sq1 for the irradiation field and the image signal Sq2 for the area outside the irradiation field according to the information on the irradiation field. The image signal Sq1 for the irradiation field and the image signal Sq2 for the area outside the irradiation field are respectively input into the frequency processing means 44 and the inversion processing means 45. A suitable frequency processing is carried out, as required, on the image signal Sq1 for the irradiation field by the frequency processing means 44 and an inversion processing is carried on the image signal Sq2 for the area outside the irradiation field by the inversion processing means 45. For example, in the case of 10-bit image, the inversion processing is carried out by operation according to a formula [inverted value of each picture element=1023-original value of each picture element].

A gradation processing is carried out by the gradation processing means 46 on the processed image signals Sq1' and Sq2' respectively processed by the frequency processing means 44 and the inversion processing means 45 and input into the image display means 50 as a final image signal Sq'.

Then the image display means 50 reproduces a visible image on the basis of the final image signal Sq'.

In the visible image, the part of the image corresponding to the area recognized to be outside the irradiation field becomes low in brightness (or high in density) in the whole since the image signal Sq2 for the area outside the irradiation field has been subjected to the gradation inversion processing. Accordingly the problem that strong light from the area outside the irradiation field impinges upon the eyes to make for hard viewing of the reproduced visible image can be avoided.

In the case where an area narrower than the actual irradiation field is mistaken for the irradiation field, the part of the image which should be recognized to be in the irradiation field and should be reproduced can be cut if the image signal components for picture elements recognized to be outside the irradiation field are evenly set to a low brightness or high density as in the conventional method disclosed in Japanese Unexamined Patent Publication No. 3(1991)-98174. In contrast, in accordance with the present invention, the image signal components for picture elements recognized to be outside the irradiation field are only inverted in gradation and if the image signal components for picture elements recognized to be outside the irradiation field carry some image, the image is reproduced in an inverted gradation, whereby whether the area determined to be outside the irradiation field includes a necessary part of the radiation image can be known.

Though, in the embodiment described above, the preliminary read-out is carried out and the irradiation field is recognized on the basis of the image signal obtained by the preliminary read-out, the present invention can be applied also to a system in which the preliminary read-out is not carried out; that is, a system in which the irradiation field is recognized on the basis of an image signal obtained by read-out and a visible image is reproduced according to the image signal.

Further though, in the embodiment described above, the visible image is reproduced on a CRT, and the present invention may be applied to a system in which the visible image is recorded on a photographic film by use of a laser printer or the like.

Further the present invention may be applied to a system where an X-ray film or the like is used in place of the stimulable phosphor sheet.

What is claimed is:

1. A method of carrying out image processing on an image signal representing a radiation image which has been recorded using an irradiation field stop and has an irradiation field, comprising by the steps of:

recognizing the irradiation field, and carrying out gradation inversion processing on the image signal components corresponding to the picture elements recognized to be outside the irradiation field out of the image signal components which make up an image signal for reproducing the radiation image as a visible image.

2. An apparatus for carrying out image processing on an image signal representing a radiation image which has been recorded using an irradiation field stop and has an irradiation field, comprising: by having:

means for recognizing the irradiation field and a gradation inversion means for carrying out gradation inversion processing on the image signal components corresponding to the picture elements recognized to be outside the irradiation field out of the image signal components which make up an image signal for reproducing the radiation image as a visible image.

3. A method of carrying out image processing on an image signal representing a radiation image which has been recorded using an irradiation field stop and has an irradiation field, comprising the steps of:

recognizing the irradiation field;

carrying out frequency processing using frequency processing means on image signal components which make up a first image signal for the irradiation field; and carrying out gradation inversion processing using gradation inversion means on image signal components which make up a second image signal corresponding to picture elements recognized to be outside the irradiation field;

wherein the radiation image is reproduced after said gradation processing steps as a visible image.

4. An apparatus for carrying out image processing on an image signal representing a radiation image which has been recorded using an irradiation field stop and has an irradiation field, comprising:

means for recognizing the irradiation field;

frequency processing means for carrying out frequency processing on image signal components which make up a first image signal for the irradiation field;

gradation inversion means for carrying out gradation inversion processing on image signal components which make up a second image signal corresponding to picture elements recognized to be outside the irradiation field;

wherein the radiation image is reproduced as a visible image after said frequency processing and said gradation inversion processing.

* * * * *